US012658838B2

(12) United States Patent
Fujimoto et al.

(10) Patent No.: US 12,658,838 B2
(45) Date of Patent: Jun. 16, 2026

(54) DUAL-MODE INVERTER SYSTEM

(71) Applicant: TOYOTA JIDOSHA KABUSHIKI KAISHA, Toyota (JP)

(72) Inventors: Akihiro Fujimoto, Gotemba (JP); Hiroaki Toyoda, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 18/961,829

(22) Filed: Nov. 27, 2024

(65) Prior Publication Data

US 2025/0266782 A1     Aug. 21, 2025

(30) Foreign Application Priority Data

Feb. 19, 2024     (JP) ................................. 2024-022892

(51) Int. Cl.
| | |
|---|---|
| *H02P 27/06* | (2006.01) |
| *H02M 1/32* | (2007.01) |
| *H02M 1/38* | (2007.01) |
| *H02M 7/5387* | (2007.01) |
| *H02P 25/18* | (2006.01) |
| *H02P 29/60* | (2016.01) |
| *H02M 1/00* | (2006.01) |

(52) U.S. Cl.
CPC ............ *H02P 27/06* (2013.01); *H02M 1/322* (2021.05); *H02M 1/38* (2013.01); *H02M 7/5387* (2013.01); *H02P 25/18* (2013.01); *H02P 29/60* (2016.02); *H02M 1/0003* (2021.05)

(58) Field of Classification Search
CPC ............... H02M 1/0054; H02M 1/084; H02M 7/53871; H02M 7/5387; H02M 1/0003; H02M 1/322; H02M 1/38; H02P 27/06; H02P 25/18; H02P 25/022; H02P 29/60
See application file for complete search history.

(56) References Cited

U.S. PATENT DOCUMENTS

| | | | | |
|---|---|---|---|---|
| 8,344,677 B2 * | 1/2013 | Takizawa | ................ | H02M 1/32 |
| | | | | 318/500 |
| 2006/0108957 A1 * | 5/2006 | Urakabe | ................ | H02P 27/06 |
| | | | | 318/400.28 |
| 2006/0164028 A1 * | 7/2006 | Welchko | ................ | H02P 27/06 |
| | | | | 318/105 |
| 2017/0234285 A1 * | 8/2017 | Huh | ...................... | H02J 7/1423 |
| | | | | 123/179.4 |

(Continued)

FOREIGN PATENT DOCUMENTS

JP          2018-014829 A        1/2018

*Primary Examiner* — Yusef A Ahmed
(74) *Attorney, Agent, or Firm* — SoraIP, Inc.

(57) ABSTRACT

The dual inverter system includes a first inverter connected to one end of a stator coil of the motor and a second inverter connected to the other end. The controller is capable of executing a single mode in which the second inverter is disconnected from the battery and the motor is driven only by the first inverter. When driving the motor in a single mode, the controller selects one of an upper short-circuiting circuit that turns on all the upper SW devices of the second inverter and turns off all the lower SW devices, and a lower short-circuiting circuit that turns on all the lower SW devices of the second inverter and turns off all the upper SW devices. The controllers compare the loads of the upper SW devices and the lower SW devices of the second inverters.

1 Claim, 3 Drawing Sheets

(56)  References Cited

U.S. PATENT DOCUMENTS

| | | | | |
|---|---|---|---|---|
| 2018/0278144 A1* | 9/2018 | Nakano | H02M 1/32 | |
| 2019/0296663 A1* | 9/2019 | Oka | H02P 21/0003 | |
| 2019/0296677 A1* | 9/2019 | Oka | H02P 21/18 | |
| 2019/0296678 A1* | 9/2019 | Omata | H02P 29/50 | |
| 2019/0386599 A1* | 12/2019 | Takahashi | H02P 7/291 | |
| 2020/0106287 A1* | 4/2020 | Niimi | B60L 53/11 | |
| 2020/0185953 A1* | 6/2020 | Shimizu | H02J 7/50 | |
| 2020/0195166 A1* | 6/2020 | Horiuchi | B62D 6/00 | |
| 2020/0244206 A1* | 7/2020 | Ohashi | B62D 6/00 | |
| 2020/0274461 A1* | 8/2020 | Koikegami | H02M 7/53875 | |
| 2021/0211084 A1* | 7/2021 | Kinjo | H02P 27/08 | |
| 2021/0234491 A1* | 7/2021 | Takahashi | H02P 27/06 | |
| 2021/0257947 A1* | 8/2021 | Kinjo | H02M 7/493 | |
| 2021/0257953 A1* | 8/2021 | Kashiwazaki | H02P 27/06 | |
| 2021/0265937 A1* | 8/2021 | Kashiwazaki | H02M 1/0054 | |
| 2021/0297006 A1* | 9/2021 | Takahashi | H02M 7/537 | |
| 2021/0384863 A1* | 12/2021 | Omata | H02P 25/22 | |
| 2022/0077807 A1* | 3/2022 | Jeong | H02P 21/22 | |
| 2022/0144114 A1* | 5/2022 | Bin | B60L 3/003 | |

| | | | | |
|---|---|---|---|---|
| 2022/0385211 A1* | 12/2022 | Jang | H02P 27/06 | |
| 2023/0017022 A1* | 1/2023 | Jeong | H02J 7/1492 | |
| 2023/0023016 A1* | 1/2023 | Lee | H02P 27/08 | |
| 2023/0115925 A1* | 4/2023 | Lim | H02P 27/14 | |
| | | | | 310/68 R |
| 2023/0170830 A1* | 6/2023 | Lee | H02P 21/22 | |
| | | | | 318/811 |
| 2023/0208337 A1* | 6/2023 | Yamamoto | H02P 25/22 | |
| | | | | 318/496 |
| 2023/0249566 A1* | 8/2023 | Kim | B60L 50/60 | |
| | | | | 320/109 |
| 2023/0253907 A1* | 8/2023 | Park | H02P 25/18 | |
| | | | | 318/811 |
| 2023/0253908 A1* | 8/2023 | Jeong | H02P 27/08 | |
| | | | | 318/504 |
| 2023/0268862 A1* | 8/2023 | Lian | H02M 7/5387 | |
| | | | | 307/10.1 |
| 2024/0198809 A1* | 6/2024 | Zhang | B60L 50/60 | |
| 2024/0424930 A1* | 12/2024 | Lee | B60L 58/20 | |
| 2025/0266781 A1* | 8/2025 | Fujiwara | H02P 27/06 | |

* cited by examiner

DUAL-MODE INVERTER SYSTEM

CROSS-REFERENCE TO RELATED APPLICATION

This application claims priority to Japanese Patent Application No. 2024-022892 filed on Feb. 19, 2024, incorporated herein by reference in its entirety.

BACKGROUND

1. Technical Field

The technology disclosed in the present specification relates to a dual inverter system that includes two inverters and one open winding motor.

2. Description of Related Art

Japanese Unexamined Patent Application Publication No. 2018-014829 (JP 2018-014829 A) discloses an example of a dual inverter system. In the dual inverter system, an alternating current end of a first inverter is connected to one end of a stator coil of a motor, and an alternating current end of a second inverter is connected to the other end of the stator coil. Turning switching devices of the first inverter and the second inverter on and off synchronously with each other enables a current that is twice as large as that when the motor is driven by one inverter to flow to the motor. That is to say, high torque is obtained at the motor. When high torque is not necessary, the other ends of a plurality of the stator coils are interconnected to create a neutral point, and the motor is driven by the first inverter alone. In the dual inverter system of JP 2018-014829 A, when the motor is driven only by the first inverter, a neutral point is created by holding all upper switching devices of the second inverter on, or by holding all lower switching devices of the second inverter on.

SUMMARY

In the dual inverter system of JP 2018-014829 A, when a neutral point is created in the second inverter, using only the upper switching devices, or using only the lower switching devices, will result in imbalance in cumulative loads of the upper switching devices and the lower switching devices. The present specification provides technology for evenly distributing load among upper switching devices and lower switching devices when creating a neutral point in a second inverter in a dual inverter system.

A dual inverter system disclosed in the present specification includes a first inverter, a second inverter, a motor, a linking switch, and a controller. A direct current end of the first inverter is connected to a battery, and each of a plurality of alternating current ends is connected to respective one ends of a plurality of stator coils of the motor. Each of a plurality of alternating current ends of the second inverter is connected to respective other ends of the stator coils. The linking switch connects a direct current end of the second inverter to the battery, and disconnects the direct current end of the second inverter from the battery, and so forth. The controller is configured to execute a dual mode in which the linking switch is closed and the motor is driven by the first inverter and the second inverter, and a single mode in which the linking switch is opened and the motor is driven by only the first inverter.

It is well known that an inverter includes a plurality of series circuits in which upper switching devices and lower switching devices are connected in series. The series circuits are connected in parallel between a positive electrode and a negative electrode of a direct current end of the inverter. A midpoint of each series circuit is connected to each of a plurality of alternating current ends of the inverter. When driving the motor in the single mode, the controller selects one of an upper short-circuiting circuit in which all upper switching devices of the second inverter are on and all lower switching devices are off, and a lower short-circuiting circuit in which all the lower switching devices of the second inverter are on and all the upper switching devices are off. The controller selects the upper short-circuiting circuit when a load of the upper switching devices of the second inverter is smaller than a load of the lower switching devices, and selects the lower short-circuiting circuit when the load of the upper switching devices of the second inverter is greater than the load of the lower switching devices. In the dual inverter system disclosed in the present specification, when the motor is driven in the single mode, the switching devices of which the load is small are turned on to create a neutral point. Therefore, the load is evenly distributed among the upper switching devices and the lower switching devices.

The controller may identify the load of the switching devices based on at least one of a temperature, a driving time, and a count of times of driving, of the switching devices. Details of the technology disclosed in the present specification, and further improvements, are described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a circuit diagram of a dual inverter system according to an embodiment;

FIG. 2 is a circuit diagram showing current flow when an upper short-circuiting circuit is selected; and FIG. 3 is a circuit diagram illustrating a current flow when a lower short-circuiting circuit is selected.

DETAILED DESCRIPTION OF EMBODIMENTS

Figure 1:
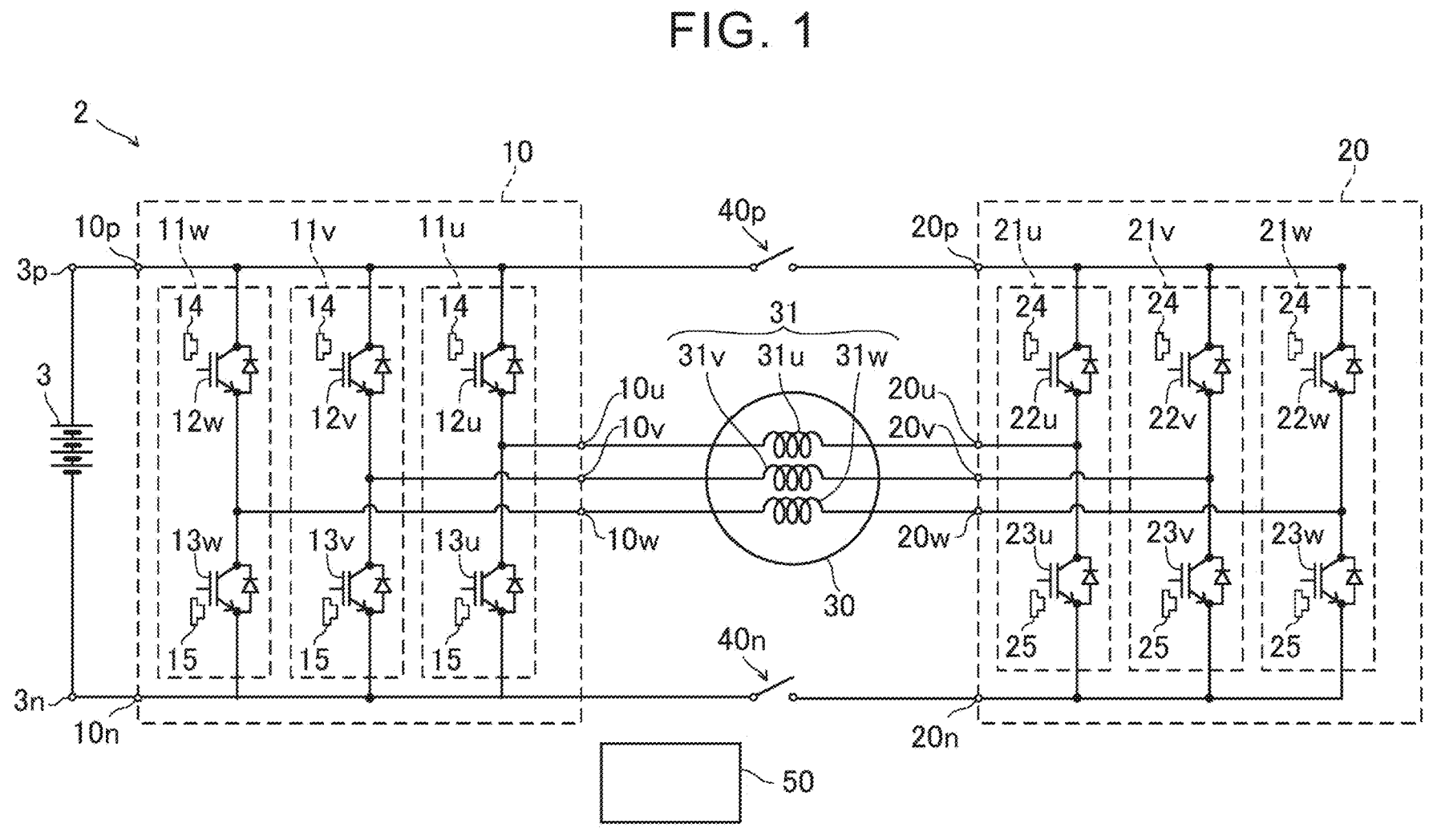

A dual inverter system 2 according to an embodiment will be described with reference to the drawings. Hereinafter, for convenience of explanation, "dual inverter system" may be abbreviated as "DI system". FIG. 1 is a schematic diagram of a DI device 2. DI device 2 includes a battery 3, a first inverter 10, a second inverter 20, a motor 30, a linking switch 40p, 40n, and controllers 50. DI device 2 is mounted on, for example, a battery electric vehicle, and a motor 30 drives an axle.

The first inverter 10 includes a direct current terminal (positive electrode 10p and negative electrode 10n) and alternating current terminals 10u, 10v, 10w. The direct current end is connected to the battery 3, and the alternating current end is connected to the motor 30.

The first inverter 10 includes three sets of series-circuit 11u, 11v, 11w. The series circuit 11u includes a series-connected circuit of the upper switching device 12u and the lower switching device 13u. Hereinafter, for convenience of explanation, the "switching device" may be abbreviated as a SW device. The upper SW device 12 and the lower SW device 13 are connected in anti-parallel. The hardware of the diode may be a separate device from SW device or may be incorporated in SW device.

The series-circuit 11$u$ is connected between the positive electrode 10$p$ and the negative electrode 10$n$ of the direct current terminal of the first inverter 10. The upper SW device 12$u$ is connected to the positive electrode 10$p$, and the lower SW device 13$u$ is connected to the negative electrode 10$n$. The midpoint of the series circuit 11$u$, that is, the midpoint of the series-connected circuit of the upper SW device 12$u$ and the lower SW device 13$u$ is connected to the alternating current terminal 10$u$ of the first inverter 10.

The series circuit 11$v$ is composed of a series-connected circuit of an upper SW device 12$v$ and a lower SW device 13$v$. The series circuit 11$w$ is composed of a series-connected circuit of an upper SW device 12$w$ and a lower SW device 13$w$. The series circuit 11$v$, 11$w$ has the same construction as the series circuit 11$u$. Hereinafter, the upper SW device 12$u$, 12$v$, 12$w$ may be collectively referred to as the upper SW device 12, and the lower SW devices 13$u$, 13$v$, 13$w$ may be collectively referred to as the lower SW device 13.

Each of the plurality of upper SW devices 12 is associated with a temperature sensor 14, and each of the plurality of lower SW devices 13 is associated with a temperature sensor 15.

The upper SW device 12 and the lower SW device 13 are driven by the controllers 50. When the controllers 50 alternately turn on and off the upper SW device 12 and the lower SW device 13 at a predetermined duty cycle, an alternating current flows through each of the alternating current terminals 10$u$, 10$v$, 10$w$.

For convenience of explanation, three sets of series circuit 11$u$, 11$v$, 11$w$ may be collectively referred to as a series circuit 11. Three series circuits 11 are connected in parallel between the positive electrode 10$p$ and the negative electrode 10$n$ of the direct current terminal of the first inverter 10. A midpoint of each of the three sets of series circuits 11 is connected to each of the alternating current terminals 10$u$, 10$v$, 10$w$. When the controllers 50 appropriately drive the six SW devices of the first inverter 10, an alternating current flows through each of the three alternating current terminals 10$u$, 10$v$, 10$w$.

The second inverter 20 has the same configuration as the first inverter 10, and includes three series-circuit 21$u$, 21$v$, 21$w$. The second inverter 20 also uses a generic name similar to that of the first inverter 10. For example, three sets of series circuit 21$u$, 21$v$, 21$w$ are collectively referred to below as series circuits 21. The same generic term is used for the upper SW devices 22$u$, 22$v$, 22$w$ and the lower SW devices 23$u$, 23$v$, 23$w$.

Three series circuits 21 are connected in parallel between the positive electrode 20$p$ and the negative electrode 20$n$ of the direct current terminal of the second inverter 20. Each of the series circuits 21 includes a series-connected circuit including an upper SW device 22 and a lower SW device 23. The upper SW device 22 and the lower SW device 23 are connected in anti-parallel. The upper SW device 22 is connected to the positive electrode 20$p$, and the lower SW device 23 is connected to the negative electrode 20$n$. The midpoint of the series-connected circuitry of the upper SW device 22 and the lower SW device is connected to the alternating current terminal. The midpoint of the series-circuit 21$u$ (21$v$, 21$w$) is connected to the alternating current terminal 20$u$ (20$v$, 20$w$).

Each of the plurality of upper SW devices 22 is associated with a temperature sensor 24, and each of the plurality of lower SW devices 23 is associated with a temperature sensor 25.

The motor 30 includes three stator coils 31$u$, 31$v$, 31$w$. One end of each of the three stator coils 31$u$, 31$v$, 31$w$ (the left end of the stator coil in FIG. 1) is connected to each of the three alternating current terminals 10$u$, 10$v$, 10$w$ of the first inverter 10. The other end of each of the three stator coils 31$u$, 31$v$, 31$w$ (the right end of the stator coil in FIG. 1) is connected to each of the three alternating current terminals 20$u$, 20$v$, 20$w$ of the second inverter 20. Hereinafter, the stator coil 31$u$, 31$v$, 31$w$ may be collectively referred to as the stator coil 31.

The motor 30 is a three-phase alternating current motor. The suffix "u"/"v"/"w" of the symbol means each phase (u-phase, v-phase, w-phase) of three-phase alternating current. In a normal motor, one end of each of the plurality of stator coils is connected to each of the plurality of alternating current ends of the inverter, and the other ends of the plurality of stator coils are connected to each other. A portion where the other ends of the plurality of stator coils are connected to each other is called a neutral point. In the motor 30, one end of the plurality of stator coils 31 is connected to the alternating current terminals 10$u$, 10$v$, 10$w$ of the first inverter 10, and the other end is connected to the alternating current terminal 20$u$, 20$v$, 20$w$ of the second inverter 20. The motor 30 having no neutral point is called an open winding type.

The positive electrode 20$p$ and the negative electrode 20$n$ of the direct current terminal of the second inverter 20 is connected to the battery 3 via a linking switch 40$p$, 40$n$. Specifically, the positive electrode 20$p$ is connected to the positive electrode 3$p$ of the battery 3 via the linking switch 40$p$, and the negative electrode 20$n$ is connected to the negative electrode 3$n$ of the battery 3 via the linking switch 40$n$. When the linking switch 40$p$, 40$n$ is closed, the second inverter 20 is connected to the battery 3, and when at least one of the linking switch 40$p$, 40$n$ is opened, the second inverter 20 is disconnected from the battery 3.

The controller 50 may drive the motor 30 using both the first inverter 10 and the second inverter 20. Specifically, the controllers 50 close the linking switch 40$p$, 40$n$. The upper SW device 12$u$ and the lower SW device 13$u$ of the series-circuit 11$u$ are alternately turned on and off. The upper SW device 22$u$ of the series 21$u$ is turned on and off in a phase opposite to the upper SW device 12$u$, and the lower SW device 23$u$ is turned on and off in a phase opposite to the lower SW device 13$u$. The same applies to other series-circuit 11$v$/21$v$ (11$w$/21$w$). When SW devices of the first inverter 10 and the second inverter 20 are driven in opposite phases in this manner, a current twice as large flows in the stator coil as compared with when the motor is driven by one inverter. That is, when the motor 30 is driven by the two inverters 10 and 20, a high torque is obtained. Driving the motor 30 by the first inverter 10 and the second inverter 20 by closing the linking switch 40$p$, 40$n$ is hereinafter referred to as a dual mode.

The controller 50 may open the linking switch 40$p$, 40$n$ and drive the motor 30 only by the first inverter 10. At this time, a neutral point is created in the second inverter 20. The controller 50 opens the linking switch 40$p$ and turns on all the upper SW devices 22$u$, 22$v$, 22$w$ of the second inverter 20. The controllers 50 keep all the lower SW devices 23$u$, 23$v$, 23$w$ of the second inverters 20 off. Then, the other ends of the plurality of stator coils 31 (the right end of the stator coil 31 in FIG. 1) are short-circuited via the upper SW devices 22. That is, the other ends of the plurality of stator coils 31 are connected to the neutral point. The controllers 50 turn on and off SW devices of the first inverter 10 as appropriate. The motor 30 is driven as a normal motor having a neutral point. The controller 50 using the second inverter 20 to create a neutral point and driving the motor 30 only by the first inverter 10 is hereinafter referred to as a single mode.

Figure 2:
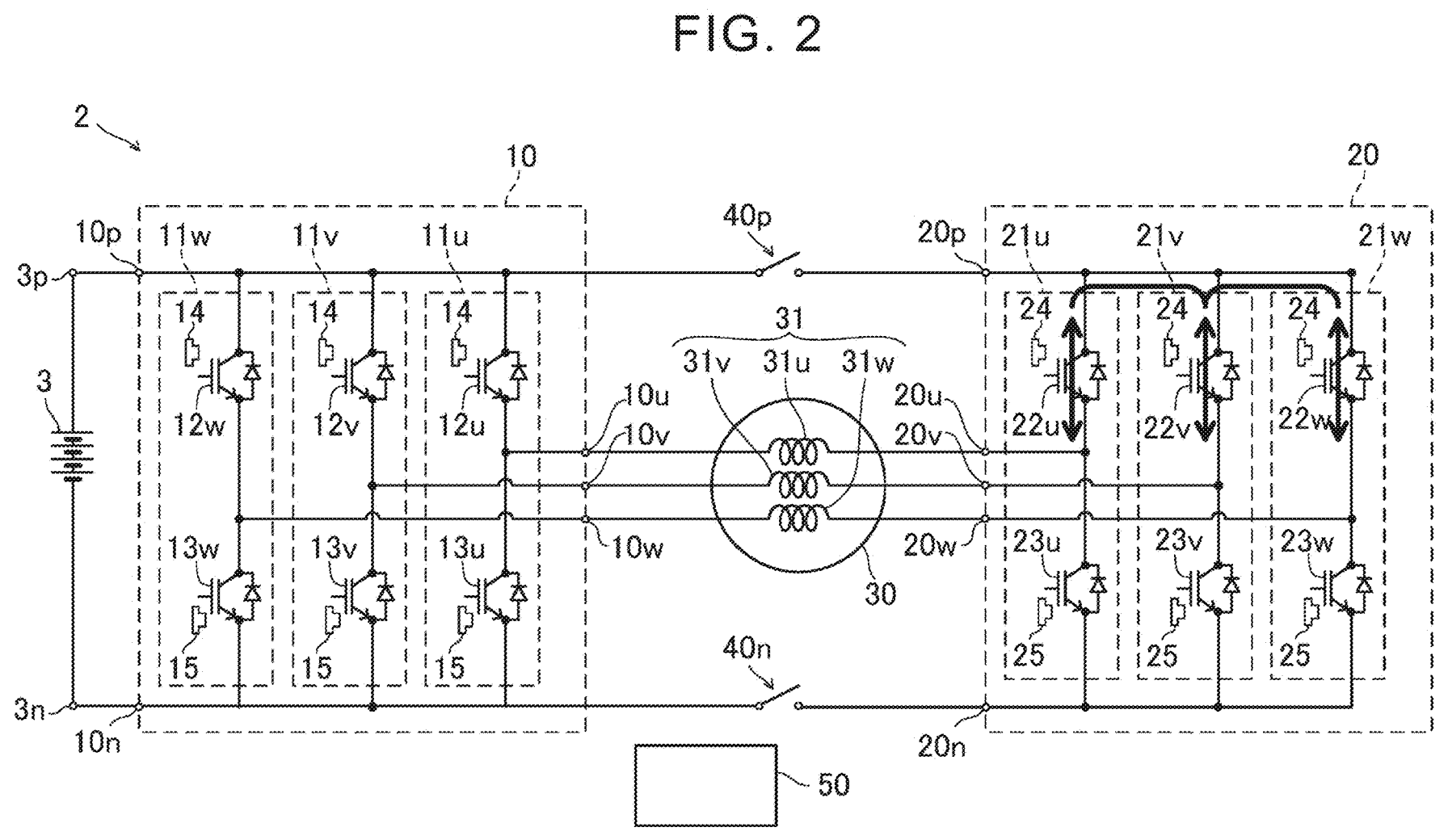

The controller 50 can create a neutral point in two ways: First, as described above, the controllers 50 hold all the upper SW devices 22 of the second inverters 20 on and all the lower SW devices 23 off. The circuit of the second inverter 20 at this time is referred to as an upper short-circuiting circuit. FIG. 2 shows the current flow in the upper short-circuiting circuit. The thick arrow line in FIG. 2 indicates the current flow in the second inverter 20.

Figure 3:
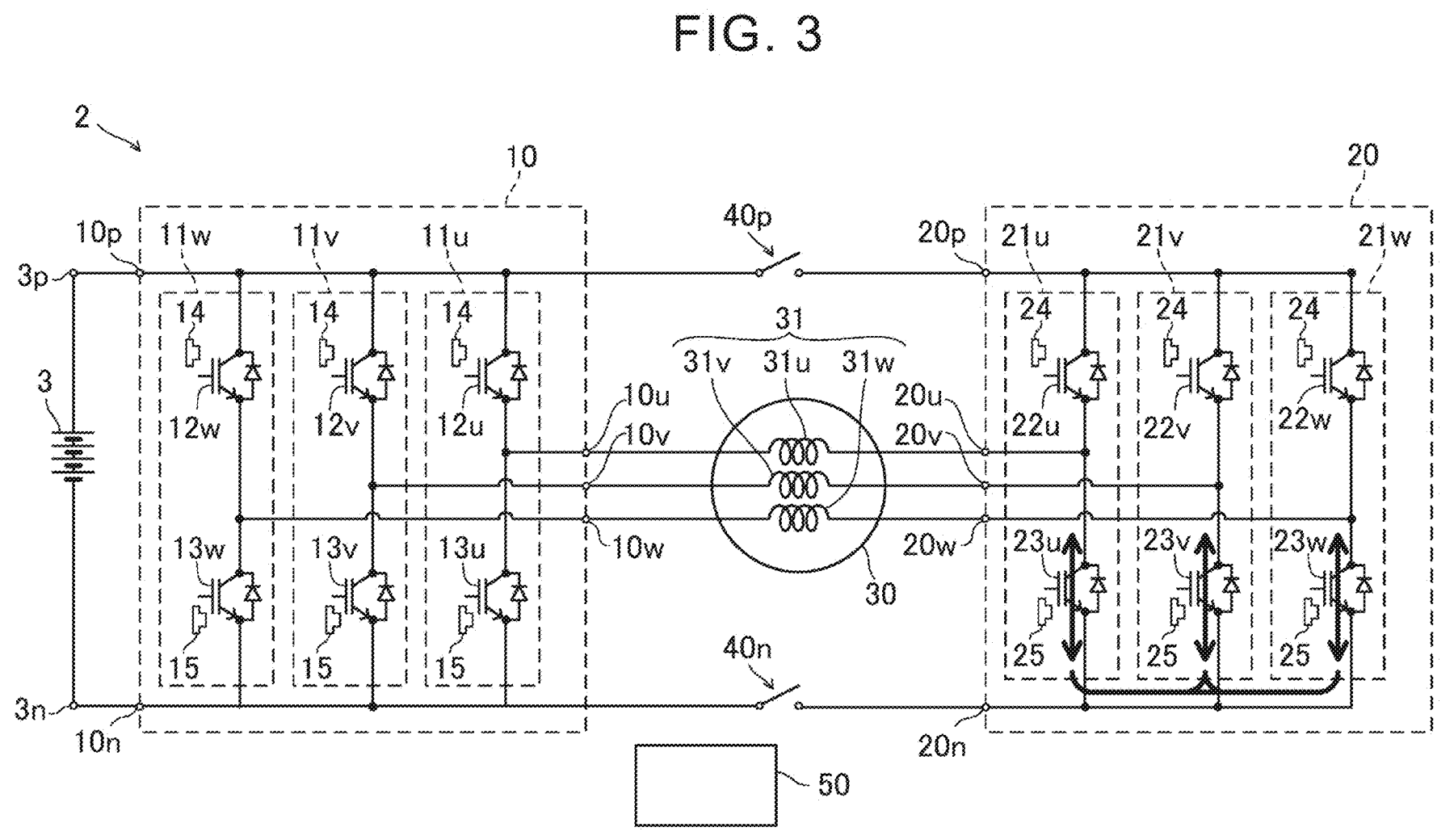

Another way to create a neutral point is as follows. The controllers 50 hold all the lower SW devices 23 of the second inverters 20 on and all the upper SW devices 22 off. The right ends of the stator coils 31 are short-circuited via the lower SW devices 23. A circuit in which all the lower SW devices 23 are held on and all the upper SW devices 22 are held off to form a neutral point is referred to as a lower short-circuiting circuit. FIG. 3 shows the current flow in the lower short-circuiting circuit. The thick arrow line in FIG. 3 indicates the current flow in the second inverter 20.

The linking switch 40p, 40n is opened for both the upper short-circuiting circuit and lower short-circuiting circuit. When driving the motor 30 in the single mode, the controller 50 opens the linking switch 40p, 40n and selects one of the upper short-circuiting circuit and the lower short-circuiting circuit.

As described above, the first inverter 10 is provided with temperature sensors 14 and 15 for measuring the temperature of SW devices, and the second inverter 20 is provided with temperature sensors 24 and 25 for measuring the temperature of SW devices. The temperature sensor 14 (24) measures the temperature of the upper SW device 12 (22), and the temperature sensor 15 (25) measures the temperature of the lower SW device 13 (23). The temperature of SW device is positively correlated with the load of SW device. The controllers 50 compare the loads of the upper SW devices 22 and the lower SW devices 23 before starting the driving of the motor in the single-mode, hold SW devices with low loads on, and hold SW devices with high loads off. More specifically, when the motor 30 is driven in the single-mode, the controllers 50 select the upper short-circuiting circuit when the load of the upper SW devices 22 is smaller than the load of the lower SW devices 23. Conversely, the controllers 50 select the lower short-circuiting circuit if the load of the upper SW devices 22 is greater than the load of the lower SW devices 23. As described above, by selecting one of the upper short-circuiting circuit and the lower short-circuiting circuit based on the load, the load of the upper SW device 22 and the load (cumulative load) of the lower SW device 23 can be leveled.

The controllers 50 identifies the loads of the upper SW devices 22 and the lower SW devices 23 based on any of the temperatures, the driving times, and the driving times of the upper SW device 22 and the lower SW device 23. There may be several types of selection methods for upper short-circuiting circuit and lower short-circuiting circuit based on load comparison.

Type 1

The controllers 50 use the driving times of the upper SW devices 22 and the lower SW devices 23 as indices of loads. That is, when driving the motor in the single mode, the controller 50 selects the lower short-circuiting circuit when the past driving time of the upper SW device 22 of the second inverter 20 in the single mode is longer than the past driving time of the lower SW device 23. On the other hand, the controllers 50 select the upper short-circuiting circuit when the past driving time of the upper SW devices 22 of the second inverters 20 in the single-mode is shorter than the past driving time of the lower SW devices 23.

Alternatively, when the motor 30 is being driven in the single mode, the controller 50 switches from the upper short-circuiting circuit to the lower short-circuiting circuit when the elapsed time of the upper short-circuiting circuit (the driving time of the upper SW device 22) reaches a predetermined threshold time. When the elapsed time of the lower short-circuiting circuit (the driving time of the lower SW device 23) reaches a predetermined threshold time, the controller 50 switches from the lower short-circuiting circuit to the upper short circuit. This type employs the latest drive time as an indicator of the load.

Type 2

The controllers 50 adopt the temperatures of the upper SW devices 22 and the lower SW devices 23 as indices of loads. That is, when the motor is driven in the single-mode, the controller 50 selects the lower short-circuiting circuit when the temperature of the upper SW device 22 of the second inverter 20 is higher than the temperature of the lower SW device 23. On the other hand, the controllers 50 select the upper short-circuiting circuit when the temperature of the upper SW device 22 is lower than the temperature of the lower SW device 23.

Alternatively, when driving the motor in the single-mode, the controller 50 selects the lower short-circuiting circuit when the number of times that the upper SW device 22 has reached the predetermined upper limit temperature in the past is greater than the number of times that the lower SW device 23 has reached the upper limit temperature in the past. On the other hand, when the number of times that the upper SW device 22 has reached the predetermined upper limit temperature in the past is less than the number of times that the lower SW device 23 has reached the upper limit temperature in the past, the controllers 50 select the lower short-circuiting circuit.

Alternatively, when the motor 30 is being driven using the upper short circuit, the controllers 50 switch from the upper short-circuiting circuit to the lower short-circuiting circuit when the temperature of any of the upper SW devices 22 reaches a predetermined upper limit temperature. When the motor 30 is driven using the lower short circuit, the controller 50 switches from the lower short-circuiting circuit to the upper short-circuiting circuit when the temperature of any of the lower SW devices 23 reaches a predetermined upper limit temperature. In this type, the present SW devices are used as indicators of loads.

Type 3

The controller 50 adopts the number of times of driving each of the upper short-circuiting circuit and the lower short-circuiting circuit as an index of the load. That is, when the number of times that the number of times of selecting the number of times of the upper short-circuiting circuit is larger than the number of times of selecting the number of times of the upper short-circuiting circuit in the past, the controller 50 selects the lower short-circuiting circuit in the present single mode. In addition, when the number of times that the number of times of selecting the number of times of the upper short-circuiting circuit is smaller than the number of times of selecting the number of times of the upper short-circuiting circuit in the past, the controller 50 selects the upper short-circuiting circuit in the present single mode.

Points to be noted regarding the technique described in the embodiment will be described. When the motor 30 is driven in the single mode, the controllers 50 open the linking switch 40*p*, 40*n*. The controller 50 opens the linking switch 40*p* when selecting the upper short-circuiting circuit. At this time, since all of the lower SW devices 23 are turned off, the linking switch 40*n* may be either open or closed. Controller 50 opens the linking switch 40*n* when selecting the lower short-circuiting circuit. At this time, since all the upper SW devices 22 are turned off, the linking switching 40*p* may be either open or closed.

When the direct current terminal and the alternating current terminal of the first inverter 10 are referred to as a first direct current terminal and a first alternating current terminal, and the direct current terminal and the alternating current terminal of the second inverter 20 are referred to as a second direct current terminal and a second alternating current terminal, respectively, the features of DI device 2 of the embodiment can be expressed as follows.

DI device 2 includes a motor 30 including a plurality of stator coils 31, a first inverter 10, a second inverter 20, a linking switch 40*p*, 40*n*, and a controller 50. The first inverter 10 includes a first direct current terminal and a plurality of first alternating current terminals, the first direct current terminal is connected to the battery 3, and each of the plurality of first alternating current terminals is connected to one end of each of the stator coils 31. The second inverter 20 includes a second direct current end and a plurality of second alternating current ends, the second direct current end is connected to the battery 3, and each of the plurality of second alternating current ends is connected to the other end of each of the stator coils 31.

The linking switch 40*p*, 40*n* connects the second direct current terminal to the battery 3 or disconnects the battery 3. The controller 50 may execute a dual mode in which the linking switch 40*p*, 40*n* is closed and the motor 30 is driven by the first inverter 10 and the second inverter 20, and a single mode in which the linking switch 40*p*, 40*n* is opened and the motor 30 is driven only by the first inverter 10.

The second inverter 20 includes a plurality of series circuits 21. Each series circuit 21 includes a series-connected circuit of upper SW devices 22 and lower SW devices 23. A midpoint of the series connection circuit is connected to the second alternating current terminal.

When driving the motor 30 in the single mode, the controller turns on all the upper SW devices 22 of the second inverter 20, and selects one of an upper short-circuiting circuit that turns off all the lower SW devices 23 and a lower short-circuiting circuit that turns on all the lower SW devices 23 of the second inverter 20 and turns off all the upper SW devices 22. The controllers 50 select the upper short-circuiting circuit when the load of the upper SW devices 22 of the second inverters 20 is smaller than the load of the lower SW devices 23. The controllers 50 select the lower short-circuiting circuit when the load of the upper SW devices 22 of the second inverters 20 is greater than the load of the lower SW devices 23.

The techniques disclosed herein are also applicable to DI having four or more series circuitry and four or more stator coils.

In the present specification, the expression "turning on the switching device" means connecting the high potential end and the low potential end of the switching device. The expression "turning off the switching device" means that the low potential end of the switching device is electrically disconnected from the high potential end. However, since the diode is connected to the switching device in anti-parallel, even if the switching device is turned off, the reverse flow of the current from the low potential end to the high potential end is allowed.

The expression "turning on the switching device" is equivalent to the expression "closing the switching device", and the expression "turning off the switching device" is equivalent to the expression "opening the switching device".

Although the specific examples of the present disclosure have been described in detail above, these are merely examples and do not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A dual inverter system comprising:

a motor that includes a plurality of stator coils;

a first inverter of which a direct current end is connected to a battery, and each of a plurality of alternating current ends is connected to respective one ends of the plurality of stator coils;

a second inverter of which a direct current end is connected to the battery and each of a plurality of alternating current ends is connected to respective other ends of the plurality of stator coils;

a linking switch that is connected between the direct current end of the second inverter and the battery; and a controller that is configured to execute a dual mode in which the linking switch is closed and the motor is driven by the first inverter and the second inverter, and a single mode in which the linking switch is opened and the motor is driven by the first inverter alone, wherein the controller is configured to, when driving the motor in the single mode, select one of an upper short-circuiting circuit in which all upper switching devices of the second inverter are on and all lower switching devices are off, and a lower short-circuiting circuit in which all lower switching devices of the second inverter are on and all upper switching devices are off, select the upper short-circuiting circuit when a load of the upper switching devices of the second inverter is smaller than a load of the lower switching devices, and select the lower short-circuiting circuit when the load of the upper switching devices of the second inverter is greater than the load of the lower switching devices, wherein the controller identifies the load based on at least one of a temperature, a driving time, and a count of times of driving, of the upper switching devices of the second inverter and the lower switching devices.

* * * * *